UNITED STATES PATENT OFFICE.

RICHARD KIRCHHOFF, OF BERLIN, GERMANY, ASSIGNOR TO THE ACTIEN-GESELLSCHAFT FÜR ANILIN FABRIKATION, OF SAME PLACE.

BLUE-BLACK DYE.

SPECIFICATION forming part of Letters Patent No. 536,879, dated April 2, 1895.

Application filed November 10, 1894. Serial No. 528,447. (Specimens.)

*To all whom it may concern:*

Be it known that I, RICHARD KIRCHHOFF, of Berlin, in the Kingdom of Prussia, German Empire, have invented new and useful Improvements in the Production of a Bluish-Black Dye; and I do hereby declare that the following is a full, clear, and exact description of the invention, which will enable others skilled in the art to which it appertains to make and use the same.

This invention relates to the production of a new tetrazo dye which produces on unmordanted cotton fast bluish-black shades.

The new coloring matter is produced by reacting with one molecule of tetrazotized para-amidobenzene-azo-amido-para-cresolether upon one molecule of alpha$_1$-naphtylamine-beta$_3$-monosulfo-acid (Clève's beta-acid) and combining the intermediate product with one molecule of gamma-amidonaphtolmonosulfo acid in alkaline solution.

The aforementioned diamido base may be obtained by combining para-nitro-diazobenzene with amido-para-cresolether and reducing the nitro-amido-azo-compound by means of alkali sulfids. The base derived in this way for instance from para-amidocresolmethylether (CH$_3$:OCH$_3$:NH$_2$=1:4:3) forms in dry state a yellowish brown powder, easily soluble in alcohol or benzene with a yellow color, melting at 115° centigrade. It is soluble in diluted hydrochloric acid with deep-red color. The preparation of the new dye derived from this base may be practically carried out in the following manner: 25.5 kilograms of para-amidobenzene-azo-amido-para-cresolmethylether or the corresponding quantity of its sulfate or hydrochlorate, are transformed by nitrite in the well known manner into the tetrazo body. The yellow-brown solution thus obtained is added to a solution of twenty-six kilograms of the sodium salt of alpha$_1$-naphtylamine-beta$_3$-sulfo acid (Clève) in presence of an excess of sodium acetate. When the formation of the intermediate product is completed, it is added to a soda alkaline solution of twenty-six kilograms of gamma-amido-naphtolmonosulfonate of sodium. The coloring matter is separated in the well known manner. It dyes unmordanted cotton deep bluish-black shades, the light tints of which are violet-gray. The coloring-matter may be diazotized on the fiber and combined with toluylendiamin, amidonaphtolether and yields blue-black shades of great fastness.

The coloring matter in a dry state is a brownish-black powder of metallic luster, soluble in cold water, more readily in hot, with a violet blue color, which on addition of caustic soda lye, is scarcely altered, an excess of the lye producing a dark violet precipitate. In alcohol the coloring matter is only very sparingly soluble with violet-blue color. In ether it is insoluble. From the aqueous solution of the coloring-matter the free color-acid is precipitated on addition of mineral acids or of acetic acid in the form of a dark indigo blue precipitate. Concentrated sulfuric acid dissolves the coloring-matter with dark indigo blue color, which, on diluting with water turns at first into bright-blue, then into violet and finally the free-color-acid separates in the form of violet flakes.

The following alterations may be made in the above example without materially changing the character of the product obtained: Instead of alpha$_1$-naphtylamin-beta$_1$-mono-sulfo-acid the alpha$_1$-naphtylamin-beta$_4$-monosulfo acid (Clève's delta-acid) or a mixture of these two acids may be used.

Having now described my invention, what I claim is—

The hereinbefore described dye derived from one molecule of tetrazotized para-amidobenzene-azo-amido-para-cresolether one molecule of alpha$_1$-naphtylamin-beta$_3$-monosulfo acid (Clève) and one molecule of gamma-amidonaphtolmonosulfo acid possessing the constitution formula

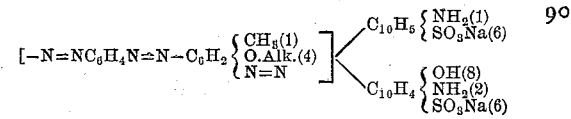

which dye is soluble in cold more readily in hot water with a violet-blue color, scarcely altered by the addition of caustic soda lye, sparingly soluble in alcohol insoluble in ether; dissolving in concentrated sulfuric acid with dark indigo blue color, which on diluting with water turns at first into bright blue, then into violet while the free color-acid separates in the shape of violet flakes; said dye producing on unmordanted cotton blueish black shades and being capable after fixation on the fiber to be rediazotized and combined on the fiber with amines or phenoles.

In testimony whereof I hereunto set my hand and affix my seal, in the presence of two witnesses, this 26th day of October, A. D. 1894.

RICHARD KIRCHHOFF. [L. S.]

Witnesses:
RUDOLF VON ROTZENBURG,
GUSTAV LUCHT.